United States Patent [19]

DeHollander

[11] 4,234,550
[45] Nov. 18, 1980

[54] METHOD FOR TREATING A PARTICULATE NUCLEAR FUEL MATERIAL

[75] Inventor: William R. DeHollander, San Jose, Calif.

[73] Assignee: General Electric Company, San Jose, Calif.

[21] Appl. No.: 739,716

[22] Filed: Nov. 8, 1976

[51] Int. Cl.$^2$ ............................................. C01G 43/02
[52] U.S. Cl. ...................................... 423/261; 423/15; 423/19
[58] Field of Search ............................ 423/261, 19, 15

[56] References Cited

U.S. PATENT DOCUMENTS

| 2,953,430 | 9/1960 | Leaders et al. ....................... 423/261 |
| 3,393,055 | 7/1968 | Stevenson .............................. 423/15 |
| 3,579,311 | 5/1971 | McCoy ................................. 423/261 |
| 3,786,120 | 1/1974 | DeHollander et al. ............... 423/261 |
| 3,872,022 | 5/1975 | DeHollander et al. ............... 423/261 |

Primary Examiner—Benjamin R. Padgett
Assistant Examiner—Deborah L. Kyle
Attorney, Agent, or Firm—Ivor J. James, Jr.; Samuel E. Turner; Sam E. Laub

[57] ABSTRACT

A process for treating a particulate uranium oxide composition containing ammonium diuranate precursors such as uranyl fluoride and uranyl nitrate, along with possible impurities, is disclosed. The process comprises the steps of (a) contacting the composition with a sufficient amount of an ammonium hydroxide solution to convert the ammonium diuranate precursors to ammonium diuranate, and (b) heating the composition under a controlled atmosphere at a temperature sufficient to dry the composition, sublime any ammonium fluoride present, and convert the ammonium diuranate to uranium dioxide. In a first modification of the invention, there is practiced the additional step of moving the composition, preferably by mechanically agitating the composition, prior to the heating step, or during the heating step, or both prior to and during the heating step, for a sufficient time to produce rounded agglomerates in the form of a readily flowable powder. In another modification of the invention, there are practiced the additional steps of mechanically agitating the composition and screening the composition prior to heating. These additional steps produce rounded agglomerates of the composition in a desired size distribution.

14 Claims, No Drawings

METHOD FOR TREATING A PARTICULATE NUCLEAR FUEL MATERIAL

BACKGROUND OF THE INVENTION

This invention relates to a method of treating particulate uranium oxide compositions containing ammonium diuranate precursors such as uranyl fluoride and uranyl nitrate, and in greater detail in a particularly preferred practice relates to treating a particulate uranium oxide composition containing a mixture or blend of uranium tritaoctoxide ($U_3O_8$) and uranyl fluoride ($UO_2F_2$) and other fluoride compound impurities including uranium tetrafluoride ($UF_4$) in which the percentage of fluoride varies from a low of about 0.7 percent or less to about 7 percent or more on a weight percent basis.

Ammonium diuranate as used herein means the term normally used in commercial practice and approaching the specific composition represented by the formula $(NH_4)_2U_2O_7$.

Oxide products of uranium have various utilities including a preferred utility as nuclear fuels for nuclear reactors. The performance of the fuel, traditionally in the form of enriched uranium dioxide structures clad in a metal container, is crucial to the proper operation of the nuclear reactor and is related to the particular structure of the uranium dioxide. Nuclear power generation has imposed severe requirements on the performance of such fuels in nuclear reactors, and the performance is strongly influenced by the grain size and density of the fuel. It has been demonstrated that fine grain uranium dioxide structures are more subject to creep than large grain uranium dioxide structures. It has also been discovered that the density of the uranium dioxide is a very important physical property influencing the performance of the fuel. In order to fabricate uranium dioxide economically and reproducibly, the starting ceramic powder should be capable of compaction to give a compact of desired density and adequate green strength with a low impurity level.

The enrichment of uranium customarily is accomplished through use of the compound uranium hexafluoride ($UF_6$). A process is therefore required for converting the enriched uranium hexafluoride into enriched uranium dioxide in a form which can be readily fabricated to fuel structures having a low fluoride content and a desired density and grain size.

One current process for converting uranium hexafluoride to an oxide product of uranium, usually uranium dioxide, employs hydrolysis of uranium hexafluoride to form a solution of uranyl fluoride and hydrogen fluoride from which ammonium diuranate is precipitated by the addition of ammonia. After filtration, the ammonium diuranate containing undesirable fluoride impurities is dissolved in nitric acid. Fluoride decontamination of the resulting uranyl nitrate solution is accomplished by solvent extraction. From the resulting purified uranyl nitrate solution, ammonium diuranate is re-precipitated and then calcined to $U_3O_8$ which in turn is reduced to uranium dioxide with heated hydrogen.

Attempts have been made to replace this involved, expensive ammonium diuranate conversion process by gas phase reaction of uranium hexafluoride. A very successful method is described in U.S. Pat. No. 3,796,672 entitled "Process for Producing Uranium Dioxide Rich Compositions from Uranium Hexafluoride", and the disclosure of this patent is hereby incorporated by reference. This patent is in the names of W. R. DeHollander and A. G. Dada and is assigned to the same assignee as the present invention. This patent discloses a process for the conversion of gaseous uranium hexafluoride to a uranium dioxide rich composition in the presence of an active flame in a reaction zone. A gaseous reactant comprising a reducing gas and a gaseous reactant comprising a mixture of uranium hexafluoride and an oxygen-containing carrier gas are separately introduced to the reaction zone. The reactants are temporarily separated by a shielding gas during the introduction to the reaction zone. The shielding gas delays the initiation of the reaction between the gaseous reactants until sufficient cross diffusion and mixing of the reactants occurs. The process of U.S. Pat. No. 3,796,672 yields a uranium dioxide-rich composition having particularly desirable properties and a gaseous atmosphere rich in reducing gas such as hydrogen.

Since it is known that certain gaseous mixtures of a reducing gas such as hydrogen and air can be readily combustible and potentially explosive, it has been found desirable to oxidize the hydrogen in such a gaseous atmosphere following the $UF_6$ to $UO_2$ conversion.

U.S. Pat. No. 3,790,493 entitled "Post Oxidation Process for Uranium Dioxide Rich Compositions" covers an improved process in which an oxygen-containing gas is introduced as a third gaseous reactant at a time when the uranium hexafluoride conversion to the uranium dioxide rich composition is substantially complete. The uranium dioxide rich composition is thereby oxidized to a higher oxide of uranium and the residual reducing gas is oxidized to form water vapor. This patent in the names of Abdul G. Dada, W. R. DeHollander and Robert J. Sloat is assigned to the same assignee as the present invention, and the disclosure of this patent is hereby incorporated by reference.

Another very successful method of replacing the ammonium diuranate conversion process by gas phase reaction of uranium hexafluoride is described in co-pending U.S. patent application Ser. No. 663,274, now U.S. Pat. No. 4,090,976, entitled "Process for Producing Uranium Oxide Rich Compositions from Uranium Hexafluoride", and the disclosure of this application is hereby incorporated by reference. This patent application was filed Mar. 3, 1976 in the names of W. R. DeHollander and C. P. Fenimore and is assigned to the same assignee as the present invention. This process accomplishes the conversion of gaseous uranium hexafluoride to a uranium oxide-rich composition in the presence of an active flame in a reaction zone. A first gaseous reactant comprising a mixture of uranium hexafluoride and a reducing carrier gas and a second gaseous reactant comprising an oxygen-containing gas are separately introduced to the reaction zone. The reactants are temporarily separated by a shielding gas during their introduction to the reaction zone. The shielding gas delays the initiation of the reaction between the gaseous reactants until sufficient cross diffusion and mixing of the reactants occurs. The flame in the reaction zone is maintained away from contact with the inlet through which the mixture is introduced to the reaction zone.

The processes of U.S. Pat. Nos. 3,796,672 and 3,790,493 and U.S. patent application Ser. No. 663,274, now U.S. Pat. No. 4,090,976, yield a uranium oxide composition containing fluoride impurities, and this composition is a very desirable, active, highly sinterable uranium oxide in the form of a powder. For some applications the powder is very desirable since compacts of such powder sinter to a very high density, typically close to 99 percent or higher of theoretical density. However for other applications it is desirable to reduce the density of sintered compacts of the powder to the range of about 92 to about 97 percent of theoretical density. Further, it is desirable to provide even greater strength to the powder compacts prior to sintering so that they retain their configuration through sintering.

OBJECTS OF THE INVENTION

It is an object of this invention to provide a process for treating compositions of uranium oxide powder to improve even further the strength of green compacts of the powder after the powder is pressed into shapes and to control the density of sintered compacts of the powder.

Another object of this invention is to provide a process for treating particulate uranium oxide compositions that removes impurities from the composition, particularly fluoride impurities.

Still another object of this invention is to provide a process for making very flowable powder in order to fill the compaction dies more uniformly in the production of green compacts for sintering.

A further object of this invention is to provide a process for treating a particulate uranium oxide composition containing ammonium diuranate precursors such as uranyl fluoride and uranyl nitrate, the process comprising the steps of contacting the composition with a sufficient amount of an ammonium hydroxide solution to convert the ammonium diuranate precursor to ammonium diuranate and then heating the composition under a controlled atmosphere at a temperature sufficient to dry the composition, sublime any ammonium fluoride present and convert the ammonium diuranate to uranium dioxide.

Other objects and advantages of this invention will become apparent to a person skilled in the art from a reading of the following summary, description of the invention and the appended claims.

SUMMARY OF THE INVENTION

The foregoing objects have been accomplished in a new process of treating a particulate uranium oxide composition containing ammonium diuranate precursors such as uranyl fluoride and uranyl nitrate, along with other possible impurities, the process comprising the steps of (a) contacting the composition with a sufficient amount of an ammonium hydroxide solution to convert the ammonium diuranate precursors to ammonium diuranate, and (b) heating the composition so formed under a controlled atmosphere at a temperature sufficient to dry the composition, sublime any ammonium fluoride present and convert the ammonium diuranate to uranium dioxide, yielding a defluorinated particulate composition comprised substantially of uranium oxide.

After the composition is treated with the ammonium hydroxide, agglomerates of ammonium fluoride, ammonium diuranate and uranium oxide are formed. In a first modification of the process of this invention, the agglomerates are mechanically agitated prior to heating, during heating, or both prior to and during heating, so that the agglomerates are rounded. In still another modification of the process of this invention, the agglomerates are mechanically agitated and then screened prior to heating so that the agglomerates are rounded and in a desired size distribution.

DETAILED DESCRIPTION OF THE INVENTION

In a first preferred practice, this invention comprises a two step process for treating particulate uranium oxide compositions, particularly compositions containing ammonium diuranate precursors such as uranyl fluoride and uranyl nitrate, along with other impurities such as uranium fluoride compounds and hydrogen fluoride. The process comprises the initial step of contacting the composition with a sufficient amount of ammonium hydroxide solution to convert the ammonium diuranate precursors to ammonium diuranate, convert the hydrogen fluoride to ammonium fluoride, and convert the uranium fluorides to ammonium diuranate or hydrolyzed oxides. The treated composition now contains agglomerates. The treated composition is next heated to a temperature of from about 300° C. to about 700° C. under a controlled atmosphere for a sufficient time so that the agglomerates are dried, the ammonium fluoride is sublimed, and the ammonium diuranate is converted to uranium oxide. This process yields a defluorinated particulate composition comprised substantially of uranium dioxide.

A preferred first modification of the process of this invention comprises a three step process for treating particulate uranium oxide compositions having ammonium diuranate precursors with or without other impurities as stated above. The process steps comprise (a) contacting the composition with a sufficient amount of a solution of ammonium hydroxide to convert the ammonium diuranate precursors to ammonium diuranate, convert the hydrogen fluoride to ammonium fluoride, and convert the uranium fluorides to ammonium diuranate or hydrolyzed oxides, with the treated composition now containing agglomerates, (b) mechanically agitating the treated composition for a sufficient period of time to cause a rounding of the agglomerates to yield a readily flowable composition, and (c) heating the composition to a temperature of from about 300° C. to about 700° C. under a controlled atmosphere sufficient to dry the agglomerates, sublime the ammonium fluoride and convert the ammonium diuranate to uranium dioxide. It is desirable to continue the mechanical agitation during the heating step. The process yields a defluorinated particulate composition comprised substantially of uranium dioxide.

A preferred second modification of the process of this invention comprises a four step process for treating particulate uranium oxide compositions having ammonium diuranate precursors with or without other impurities as stated above. The process steps comprise (a) contacting the composition with a sufficient amount of a solution of ammonium hydroxide to convert the ammonium diuranate precursors to ammonium diuranate, convert the hydrogen fluoride to ammonium fluoride, and convert the uranium fluorides to ammonium diuranate or hydrolyzed oxides, with the treated composition now containing agglomerates, (b) mechanically agitating the treated composition for a sufficient period of time to cause a rounding of the agglomerates to yield a readily flowable composition, (c) screening the agglomerates to a given size distribution, and (d) heating the composition to a temperature of from about 300° C. to about 700° C. under a controlled atmosphere for a time sufficient to dry the agglomerates, sublime the ammonium fluoride, and convert the ammonium diuranate to uranium dioxide. Again, it is desirable to continue the mechanical agitation during the heating step. The process yields a defluorinated particulate composition comprised substantially of uranium dioxide.

The particulate uranium oxide compositions containing ammonium diuranate precursors can include one or more of the uranium oxides such as uranium dioxide, uranium trioxide, uranium tritaoctoxide [e.g., urasonic oxide—$UO_2.2UO_3$, uranyl uranate—$(UO_2)_2 UO_4$, uranous uranate—$U(UO_4)_2$], uranium sesquioxide, uranium pentoxide, and uranium tetroxide. The particulate uranium oxide compositions can also include one or more other components in mixtures such as ceramics including plutonium oxide, gadolinium oxide, thorium oxide, silicon dioxide, etc.

While the fluoride impurities can be present as fluoride compounds, the impurities can also include oxyfluoride compounds and mixtures of fluoride compounds and oxyfluoride compounds. The metallic or other ions combined with the fluoride or oxyfluoride can be one species or mixtures of several species with representative mixtures including uranium with plutonium, thorium, gadolinium, etc., in addition to the normal industrial impurities of iron, calcium, magnesium and sodium. Representative fluoride impurities encountered in the compositions treated by the practice of this invention include $UF_4$, $UF_6$, $HF$, solid solutions of either $UF_4$ or $UF_6$ or both in uranium oxides, $PuF_4$, $PuF_2$, $(U, Pu)F_4$, $(U, Pu)F_2$, and solid solutions of $(U, Pu)F_4$ in a mixture of uranium oxide and plutonium oxide. Representative oxyfluoride impurities encountered in the compositions treated by the practice of this invention include $UO_2F_2$, $UO_2F$, $UOF_2$, solid solutions of $UOF_2$ in $UO_2$, solid solutions of $UO_2F_2$ in $U_3O_8$, $PuOF$, $(U, Pu)O_2F_2$, and solid solutions of $(U, Pu)O_2F_2$ in a mixture of uranium dioxide and plutonium oxide.

The contacting step is conducted so that the particulate uranium oxide composition is thoroughly and intimately mixed with the ammonium hydroxide to insure thorough reaction. Sufficient ammonium hydroxide is added so that at the completion of the reaction, the resulting slurry should have a pH of about 9 or greater, preferably in the range of a pH of 9 to 11. Preferably the ammonium hydroxide is added to the composition while it is mechanically agitated to insure mixing of the composition. Conversely, the powder can be added to the solution of ammonium hydroxide, which may be more convenient for pumping the treated composition around, especially if the solution volume to powder volume is high enough to produce a low viscosity slurry.

The ammonium hydroxide employed in the practice of this invention can be commercial grade and can have any concentration consistent with the liquid volume desired, which is set by the concentration. However, the impurity content of the ammonium hydroxide must be maintained at a sufficiently low level so that when the liquid phase is evaporated the residual impurities so introduced are within the desired limits for the uranium oxide product produced. Heating can be beneficial but unless done in sealed vessels, will result in loss of considerable ammonia gas.

The contacting of the particulate uranium oxide composition with a sufficient amount of the ammonium hydroxide converts the fluoride impurities to ammonium fluoride and the uranyl fluorides to ammonium diuranate and yields a product ranging in form from slightly damp solid compositions containing agglomerates with up to 15% by weight moisture to easily pumpable slurries. Typical slightly damp solid compositions after being treated with the ammonium hydroxide contain agglomerates of uranium oxide and uranium diuranate in the −20 mesh size range. In some practices it is considered desirable to screen out the agglomerates greater than −20 mesh and less than 100 mesh to be recycled.

The chemical reaction postulated for a $U_3O_8$ fuel containing $UO_2F_2$ as the ammonium diuranate precursor is as follows:

$$U_3O_8 + 2UO_2F_2 + 6NH_4OH \rightarrow U_3O_8 + (NH_4)_2U_2O_7 + 4NH_4F + 3H_2O.$$

The heating step is conducted in a temperature range sufficient to dry the agglomerates, sublime any ammonium fluoride present and convert the ammonium diuranate to uranium dioxide. This yields a defluorinated particulate composition comprised substantially of uranium dioxide. In practice it has been found that a temperature range from about 300° C. to about 700° C. for a period from about 1 to about 3 hours is adequate to achieve this. Temperatures below about 300° C. are undesirable because the heating step proceeds too slowly, while temperatures above about 700° C. are usually undesirable due to the possible sintering of agglomerates with resulting loss of surface area of the powder (i.e., a dead powder). If a dead powder is desired, temperatures in excess of 700° C. are used.

The heating step is conducted in a controlled atmosphere, preferably an atmosphere having an oxygen partial pressure limited to the range of $10^{-4}$ to $10^{-18}$ atmospheres of oxygen depending on the uranium oxide product desired. Typically the atmospheres employed are wet hydrogen, dry carbon monoxide, wet carbon monoxide, inert gases such as nitrogen, argon, helium, and neon and mixtures of the foregoing inert gases, or a mixture of hydrogen and carbon dioxide.

When it is desired to include the step of mechanically agitating the composition for a sufficient time to round the agglomerates into a good flowable powder, a preferred practice involves tumbling the composition in a horixontal cylindrical mixing vessel at about 5 to about 60 revolutions per minute for about 20 minutes. The composition must be damp (i.e., contain up to about 15% by weight water) but with no visible liquid phase in order to practice this step.

When it is desired to include the step of screening the composition after mechanically agitating it for a sufficient time to round the agglomerates, a screen having openings in the range of about 8 to about 10 mesh is employed.

This invention provides several improvements in the processing of uranium oxide powders. In particular, the composition or powder resulting from the practice of this invention can be used to produce green or unsintered pellets of strength greater than the pellets of the untreated powder produced by the methods of U.S. Pat. No. 3,796,672, No. 3,790,493 and U.S. patent application Ser. No. 663,274, now U.S. Pat. No. 4,090,976. The process also provides a composition containing free flowing agglomerates that can be readily fed to a calciner for thermal treatment of the composition. The composition resulting from the practice of the process of this invention does not require the conventional steps of isopressing to form a green compact that is crushed and granulated before pressing the composition into shapes (typically cylinders) prior to sintering. If the particulate uranium oxide composition treated in the process contains fluoride impurities and oxides at a higher oxide state than uranium dioxide, then this process achieves removal of these fluoride impurities and can reduce the higher oxides to uranium dioxide in the heating step through use of the proper atmosphere.

The process of this invention increases the green strength of structures compacted from the uranium dioxide powders. The benefits of this invention are most noticeable for a uranium oxide composition containing from about 3 to about 15 percent by weight of the ammonium diuranate precursor. Below about 3 percent very little effect on green strength is apparent and above about 15 percent the increase in green strength occurs but with less predictability.

The following examples are offered to show representative processes of the disclosed invention as carried out to treat particulate uranium oxide compositions. These examples are included to be representative of this process and in no way serve to limit the invention.

EXAMPLE 1

2000 grams of particulate uranium oxide ($U_3O_8$) powder produced according to the process of U.S. Pat. No. 3,790,493 were used in this Example. This powder was deliberately produced to have a much higher than normal fluoride content.

The powder was subjected to various tests to determine the structure and the nature of the impurities. Leaching of the powder in water extracted the water soluble uranium and fluoride constituents, and confirmed the presence of $UO_2F_2$ in this powder at a concentration of 25% by weight of the total powder. Scanning electron microscopy yielded the particle size, particle shape and the relation of one particle to adjacent particles. Mass spectrographic analysis yielded the particular metallic ions present in the powder, primarily the isotopes of uranium. Titration of the free acid leached from the powder in a water solution indicated the presence of hydrogen fluoride. X-ray diffraction showed trace lines of various compounds including $UO_2$, $UO_3$, $U_4O_9$, the presence of a uranium oxyfluoride and faint indications of $UF_4$ and $UF_6$. Determination of the oxygen-to-uranium ratio before and after leaching with water identified the presence of various compounds including $UO_2$, $UO_2F_2$, $UF_4$, $UO_3$ and $U_4O_9$. The powder was found to contain 3.9 weight percent fluoride. The powder was divided into a control and a batch to be treated according to the practice of the process of this invention.

The batch of particulate uranium oxide powder was placed in a Simpson mixer-muller for intensive mixing, and the powder was contacted with 175 cc of 58 percent by weight ammonium hydroxide per kilogram of powder to convert the uranyl fluoride to ammonium diuranate. The ammonium hydroxide was added drop wise to the powder as it was mixed in the mixer-muller. The foregoing amount of ammonium hydroxide was in excess of what is theoretically needed for reaction and assured complete reaction with the powder. The powder became warm during the ammonium hydroxide addition, indicating an exothermic reaction. The powder remained fairly dry but agglomerated to some extent due to the addition of the liquid and the intensive mulling action. Samples from this batch of powder treated with ammonium hydroxide, together with samples from the control, were analyzed. The powder samples were then heated to 650° C. for three hours in a furnace containing substantially wet hydrogen, isopressed at 12,000 psi and then granulated through a 20 mesh screen.

Portions of the powder from both the treated and the control samples were pressed into pellets on a Hydramet press. These pellets were not sintered. A comparison of the strength of these unsintered pellets as determined by crushing tests shows that the strength of pellets made from powder treated by the process of this invention to be an average of 60 percent higher than the strength of pellets made from the control powder.

Pellets made from both the treated and untreated samples were sintered at a peak temperature of 1700° C. for 3 hours in an atmosphere of substantially wet hydrogen. The pellets produced from the untreated powder were about 97% of theoretical density. The pellets produced from powder treated by the process of this invention were in the range of 90–92% of theoretical density.

Another portion of the powder treated by the process of this invention was milled in a hammermill at 10,000 RPM at a slow feed rate to accomplish the best milling possible. Powder from the mill was isopressed, granulated and pressed into pellets as before. Pellet strengths measured here indicated that milling destroyed some of the increased strength which was gained by the process of this invention. Pellets from this powder sintered to a range of 94–95% of theoretical density.

EXAMPLE 2

A second batch of $U_3O_8$ containing about 25% $UO_2F_2$ was divided into a control sample and an experimental sample. The experimental sample was treated with the same quantity of ammonium hydroxide as in Example 1 but the treatment was made with sufficient additional water (about 400 cc per kilogram of powder) to form a slurry. The slurry was stirred to uniformity, and then in sequence dried, granulated, and heated at 650° C. for three hours in wet hydrogen. The material was not isopressed and granulated after heating.

The treated powder and the control powder were pressed into pellets on the Hydramet press in a manner resulting in a range of densities for the pressed pellets. These pellets were subjected to a crushing test to obtain a measure of their strength. The apparatus used for this test was a Carver hand press, in which the press platen was moved by the hand operation of a hydraulic pump. The press was temporarily equipped with a low capacity pressure gauge to read out in the range of 0–200 psig. The pellets to be crushed were placed in an oversized die and squeezed axially between flat faced punches. It was concluded that crushing strength was directly proportional to density. Pellet strength was higher for pellets made from powders treated according to the process of this invention. For example at a density of about 5.20 grams per cubic centimeter, the crushing strength of pellets made from powder treated according to the process of this invention was about 1130 psi versus 975 psi for pellets from the control powder.

As will be apparent to those skilled in the art, various modifications and changes may be made in the method described herein. It is accordingly the intention that the invention be construed in the broadest manner within the spirit and scope as set forth in the accompanying claims.

What is claimed is:

1. A method of treating a particulate uranium oxide composition containing from about 3 to about 15 percent by weight of an ammonium diuranate precursor, with or without fluoride impurities, comprising the steps of
   (a) contacting said composition with a sufficient amount of an ammonium hydroxide solution to convert said precursor to ammonium diuranate, convert any fluoride compounds to ammonium fluoride, and form a treated composition containing solid agglomerates, and
   (b) heating the treated composition under a controlled atmosphere at a temperature of from about 300° C. to about 700° C., said temperature being sufficient to dry the agglomerates, sublime any ammonium fluoride, and convert the ammonium diuranate to uranium dioxide yielding a particulate composition comprised substantially of uranium dioxide, said composition being capable of compaction into unsintered structures of increased strength.

2. A method according to claim 1 in combination with the step of mechanically agitating the agglomerates from step (a) for a sufficient period of time to produce rounding of the agglomerates and a flowable composition.

3. A method according to claim 2 in which the agitating step is accomplished by tumbling the agglomerates in a horizontal cylindrical mixing vessel.

4. A method according to claim 2 in which the agitating step is performed during the heating step.

5. A method according to claim 2 in which the agitating step is performed prior to and during the heating step.

6. A method according to claim 2 in which the agitating step is performed prior to the heating step.

7. A method according to claim 1 in combination with the steps of mechanically agitating the agglomerates of step (a) for a sufficient period of time to produce rounding of the agglomerates giving a flowable composition and screening the agglomerates to a size in the range of about −20 to about +100 mesh.

8. A method according to claim 1 in which the particulate uranium oxide composition is comprised of uranium dioxide and the precursor is a fluoride compound.

9. A method according to claim 8 in which the precursor is uranyl fluoride.

10. A method according to claim 1 in which the precursor is uranyl nitrate.

11. A method according to claim 1 in which the contacting step (a) is accomplished by adding the ammonium hydroxide to the uranium oxide composition during mixing of the composition.

12. A method according to claim 1 in which the heating step is conducted in an atmosphere comprised of wet hydrogen.

13. A method according to claim 1 in which the heating step is conducted in an atmosphere comprised of a mixture of hydrogen and carbon dioxide.

14. A method according to claim 1 in which the composition is added to the ammonium hydroxide solution during mixing.

* * * * *